Patented Sept. 9, 1924.

1,507,993

UNITED STATES PATENT OFFICE.

HANS JOACHIM FALCK, OF NOTODDEN, AND THOR MEJDELL, OF SKOIEN, NEAR CHRISTIANIA, NORWAY, ASSIGNORS TO NORSK HYDRO-ELEKTRISK KVAELSTOFAKTIESELSKAB, OF CHRISTIANIA, NORWAY.

PROCESS FOR THE PRODUCTION OF ALUMINA AND NITRATES.

No Drawing. Application filed February 27, 1922. Serial No. 539,761.

*To all whom it may concern:*

Be it known that we, HANS JOACHIM FALCK, of Notodden, and THOR MEJDELL, of Skoien, near Christiania, citizens of the Kingdom of Norway, residing at Notodden and at Skoien, near Christiania, Norway, have invented certain new and useful Improvements in Processes for the Production of Alumina and Nitrates, of which the following is a specification.

By dissolving aluminum-containing materials such as leucite, kaolin, labradorite, etc., in nitric acid, solutions are obtained which contain aluminum nitrate and nitrates of alkali and alkaline earth metals.

Among the methods which have been proposed for the treatment of such solutions, the most important are those which separate the aluminum content in the form of insoluble compounds thereof, such as the oxide or the hydroxide, leaving the nitrates of the alkali and the alkaline earth metals in solution. When using these methods the nitrate solution is generally treated with a solution of a precipitant whereby a quantity of water is introduced into the process which must be evaporated at a later stage. Consequently it would appear to be better to treat the nitrates with a basic substance, that is, a substance capable of combining with the nitrate radical and liberating the alumina, for instance, ammonia, lime, calcium carbonate, potassium carbonate, etc., in dry form or in a form containing but little water. If this is done, however, without anything further the resulting mixture or reaction product when heated will be sticky and form lumps or stick to the walls of the apparatus in which it is handled.

This difficulty will be avoided by using the following method and, at the same time, the alumina formed will be easy to filter and wash after subsequent extraction. The method consists in mixing the nitrates with alumina or with some other solid substance and heating the resulting mixture together with the basic substance. By this means the alumina is disengaged during the formation of the nitrate of the basic substances, that is, ammonium nitrate, calcium nitrate, potassium nitrate, etc. The reaction mixture can then be extracted with water which dissolves the nitrates while the alumina remains in a state that is easy to filter and wash. The nitrate solution can be used for the preparation of alkali or alkaline earth metal nitrates or fertilizers.

The alumina produced can, of course, be used in the process. For this purpose it is not necessary to extract the soluble nitrates first. A part of the mixture which comes out of the heating apparatus can be used directly.

It is also advisable to decompose a part of the aluminum nitrate content of the mixture of nitrates before mixing it with the basic substance. By this means a good deal of nitric acid is obtained and the production of nitrates is correspondingly reduced. If some of the mixture which comes from the heating apparatus is used in the process as suggested above it is expedient to subject it to a preliminary drying process in order to reduce the bulk of the material to be handled.

Two examples of the process are given below in which leucite is the raw aluminum-containing material and ammonia is the basic substance employed:

*Example 1.*

Crystals of aluminum nitrate and potassium nitrate produced by crystallizing a solution formed by treating leucite with nitric acid are mixed with their own weight of alumina and the mixture is placed in an apparatus where it is brought into an atmosphere of ammonia gas during gradual heating up to 100–130° C. During this process aluminum nitrate and ammonia interact forming aluminum hydroxide and ammonium nitrate and the material remains in its crystalline state. By extraction, the aluminium hydroxide is separated from soluble nitrates and remains as a sediment which is easy to filter and which can be treated in the usual manner.

*Example 2.*

Crystals of aluminum nitrate and potassium nitrate are melted and placed in a boiler where water and nitric acid are expelled during the eventual conduction of vapour. The acid is expelled in order to reduce the quantity of precipitant or basic substance required and it may be stated as an example that without any large consumption of heat 25% of the nitric acid content of the mixture of crystals can be expelled without danger of the melt becoming burnt on the walls of the apparatus. The acid which is recovered can be used for dissolving more leucite. The residue from this heating operation is mixed as described in Example 1 with its own weight of aluminum oxide and decomposed with ammonia.

This process is particularly adaptable to the treatment of aluminium nitrate products that are free of iron or to mixtures of nitrates that are obtained by crystallization. The crystallization of the nitrates is then performed in solutions which contain a surplus of alumina as it has been found that by this means nitrates that are quite free of iron can be directly obtained.

We claim:

1. Process for the production of alumina and nitrates which consists in forming a mixture of nitrates containing aluminum nitrate, mixing such mixture of nitrates with an alumina-containing material in such a quantity that the resulting mixture will not melt during the subsequent heating, heating said resulting mixture in the presence of a basic substance and working the product of the heating operation for the recovery of alumina and nitrates.

2. Process for the production of alumina and nitrates which consists in forming a mixture of nitrates containing aluminum nitrate, removing part of the nitrate content of the mixture therefrom in the form of nitric acid, mixing the resulting material with an alumina-containing material in such a quantity that the resulting mixture will not melt during the subsequent heating, heating said resulting mixture in the presence of a basic substance and working the product of the heating operation for the recovery of alumina and nitrates.

In testimony whereof, we affix our signatures.

HANS JOACHIM FALCK.
THOR MEJDELL.